United States Patent [19]

Turillon et al.

[11] 4,134,491
[45] Jan. 16, 1979

[54] HYDRIDE STORAGE CONTAINMENT

[75] Inventors: Pierre P. Turillon, Ramsey; Gary D. Sandrock, Ringwood, both of N.J.

[73] Assignee: The International Nickel Company, Inc., New York, N.Y.

[21] Appl. No.: 880,960

[22] Filed: Feb. 24, 1978

[51] Int. Cl.² .................. F17C 11/00; C01B 1/26; B65D 25/00; F16L 55/04
[52] U.S. Cl. .......................... 206/0.7; 34/15; 62/48; 138/26; 220/88 R; 423/248; 423/648 R
[58] Field of Search .......... 206/0.7; 220/88 R, 3; 423/248, 648; 55/523; 34/15; 62/48; 138/26, 28

[56] References Cited
U.S. PATENT DOCUMENTS

| 1,058,572 | 4/1913 | Finlay | 138/28 |
| 1,080,263 | 12/1913 | Coleman | 220/88 R |
| 1,084,116 | 1/1914 | Slick et al. | 206/0.7 |
| 2,968,318 | 1/1961 | Bauman | 138/26 |
| 3,315,479 | 4/1967 | Wiswall, Jr. et al. | 34/15 |
| 3,375,676 | 4/1968 | Reilly, Jr. et al. | 34/15 |
| 3,508,414 | 4/1970 | Wiswall, Jr. et al. | 62/48 |
| 3,516,263 | 6/1970 | Wiswall, Jr. et al. | 62/48 |
| 3,922,872 | 12/1975 | Reilly, Jr. et al. | 423/248 |
| 3,931,395 | 1/1976 | Beckert et al. | 423/648 |
| 4,085,590 | 4/1978 | Powell et al. | 34/15 |

*Primary Examiner*—William T. Dixson, Jr.
*Attorney, Agent, or Firm*—Ewan C. MacQueen; Francis J. Mulligan, Jr.

[57] ABSTRACT

Discloses the use of collapsible hollow structures within a mass of metal-hydride material used in a pressure vessel for storing hydrogen.

8 Claims, 5 Drawing Figures

U.S. Patent  Jan. 16, 1979  4,134,491

HYDRIDE STORAGE CONTAINMENT

BACKGROUND OF THE INVENTION

Hydrogen is stored conventionally as a gas in steel cylinders at high pressures (e.g., 2,000 psi) and at lower pressures as liquid in insulated containers. Both methods of storage require comparatively bulky storage containers. In addition to their unwieldy size, such containers are inconvenient due to the high pressure required for gas storage in cylinders and the ever present danger of gaseous hydrogen evolving from boiling-off of the liquid form.

Within recent years, considerable attention has been focused on the storage of hydrogen as a metallic compound, or hydride, of various substances. Metal hydrides can store large amounts of hydrogen at low and even sub-atmospheric pressures in relatively small volumes. This low pressure storage of hydrogen is relatively safe and allows the construction of hydrogen containers having forms significantly different than those presently known.

Hydridable metals are charged with hydrogen by introducing pressurized gaseous hydrogen into valved containers. The hydrogen gas reacts exothermically with the metal to form a compound. Discharging of the metal hydride is accomplished by opening the valve of the container, to permit decomposition of the metal hydride, an endothermic reaction. It has been found expedient when gas is desired from the storage vessel to heat the storage vessel thereby increasing the flow of hydrogen or providing hydrogen at pressures substantially above atmospheric.

During the adsorption/desorption process, the hydridable metal has been found to expand and contract as much as 25% in volume as a result of hydrogen introduction and release from the metal lattice. Such dimensional change leads to fracture of the metal powder particles into finer particles. After several such cycles, the powder selfcompacts causing inefficient hydrogen transfer. Additionally, and of even greater significance, high stresses due to the compaction of the powder and expansion during hydride formation are directed against the walls of the storage container. The stress within the powder has been observed to accumulate until the yield strength of the container is exceeded whereupon the container plastically deforms, buckles or bulges and eventually ruptures. Such rupture is extremely dangerous since a fine, often pyrophoric powder is violently expelled by a pressurized, flammable hydrogen gas. Small, experimental cylinders of the aforedescribed type have indeed been found to burst when subjected to repetitive charging/ discharging conditions.

The problem of expansion and compaction has been recognized in the art to the extent that containers are only partially filled with hydridable metal powders. The problem of hydridable metal powder particle breakdown has been addressed in U.S. Pat. No. 4,036,944 wherein a thermoplastic elastomer binder is used to form pellets of the hydridable metal particles. Although this provides a solution to a portion of the problem of hydrogen storage, polymers are notoriously poor heat conductors, are subjected to thermal deterioration and perhaps react with hydrogen. Since heat is generated during hydrogen charging and since heat may, in many cases, be added during discharging, such polymer containing pellets appear to be only partially useful under somewhat restrictive operational conditions.

DISCOVERY AND OBJECTS

It has now been discovered that by means of special mechanical configurations the problems inherent in the hydride containment of hydrogen can be overcome.

It is an object of the invention to provide a novel gas-containing, particularly hydrogen-containing means.

BRIEF DESCRIPTION OF THE DRAWINGS

Other objects and advantages will become apparent from the following description taken in conjunction with the drawing in which.

GENERAL DESCRIPTION

The gas-containing means of the present invention generally comprises a pressure resistant vessel with a valved port and having at least one collapsible structure in the vessel enclosing space (hereinafter referred to as unavailable space). The collapsible structure, advantageously resilient so as to reform in shape after collapsing, deforms at a stress less than the stress which will plastically deform the pressure vessel. In the pressure vessel in the space not occupied by the collapsible structures (hereinafter referred to as available space), are located a multiplicity of solid, gas absorbing particles. These particles occupy substantially less than the volume of available space when in the gas-free condition and no more than the available space when in the gas-charged condition. Advantageously, the gas-charged particles occupy no more than about 75 to 85% of the available space.

When many collapsible structures such as capsules or spheres, permeable to gas but impermeable to solids, are used they can be randomly distributed in the pressure vessel or perferentially located in critical regions of the pressure vessel. As gas-absorbing particles fracture due to volume changes during charging and discharging, there is a tendency for the particles to settle under gravity to the bottom of the pressure vessel. It is thus advantageous to locate a high concentration of collapsible structures near the bottom of the pressure vessel. Such can be done by mounting the collapsible structures on a frame similar to a sculptor's armature.

Collapsible structures employed in the gas-containment means of the present invention can be hollow capsules, spheres, tubes etc. made of metal, plastic or the like. Advantageously, these structures are freely gas permeable but necessarily must be so constructed that solid particles are excluded from their interiors.

DESCRIPTION OF DRAWINGS

Figure 1:
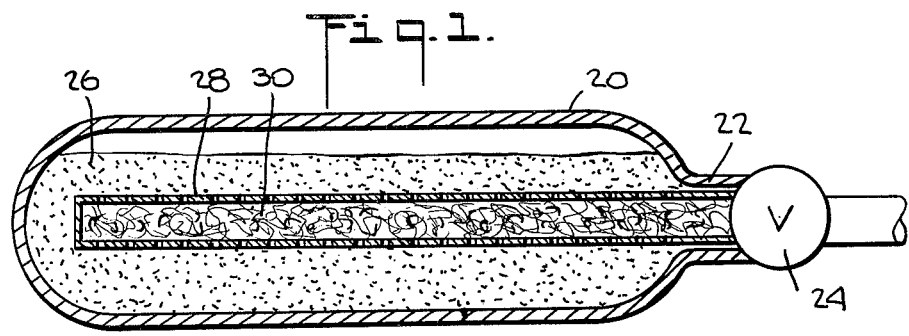
FIG. 1 is a cross-sectional view of a gas storage container embodying an axially located crushable structure.

Referring now to FIG. 1 of the drawings, pressure vessel 20 fitted with port 22 and valve 24 contains, in available space, particles of hydridable metal 26. A collapsible structure 28 extends axially through pressure vessel 20 from port 22 substantially the entire length of pressure vessel 20. Collapsible structure 28 comprised in a specific experiment a thin walled copper tube closed at one end 63cm long 1.6cm OD and 1.4cm I.D. The tube was provided with a series of 0.05cm holes along the length thereof and was packed with glass wool 30 to ensure that particles 26 would not enter structure 28. Hydrogen gas enters and leaves pressure vessel 20 through collapsible structure 28 which serves to distribute and collect the hydrogen uniformly along the length of pressure vessel 20 as well as to provide a means for dissapating the effects of localized excess pressures.

Figure 2:
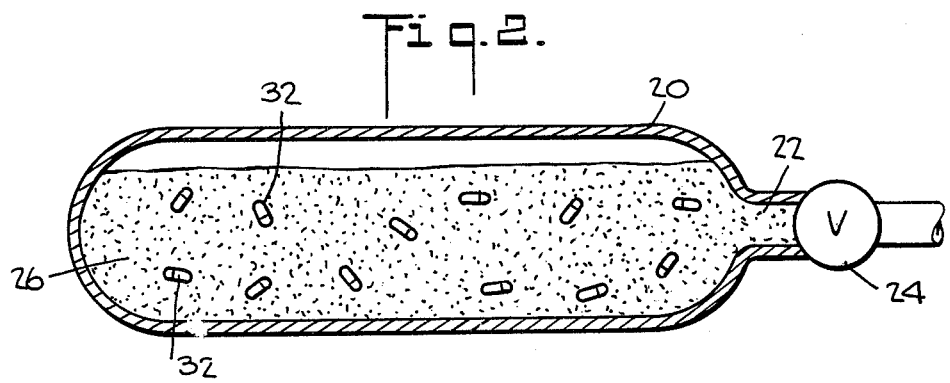
FIG. 2 is a cross-sectional view of a gas storage container embodying a plurality of randomly dispersed crushable structures.
Figure 3:
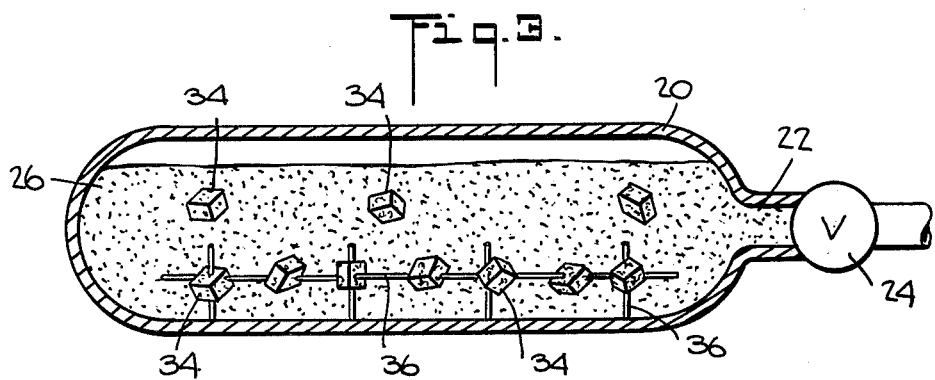
FIG. 3 shows in cross-section a gas storage container having a plurality of crushable structures preferentially positioned therein.
Figures 4, 4A:
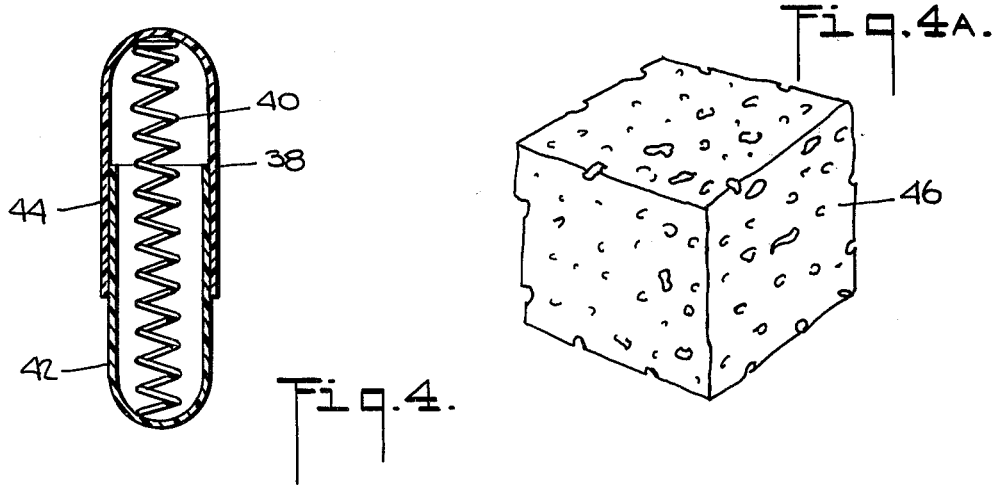
FIGS. 4 and 4A show, in cross-section, a resilient crushable structure operable in the storage containers depicted in FIGS. 2 and 3.

FIG. 2 shows a random distribution of collapsible structures 32 dispersed in the mass of powdered hydridable metal 26 within pressure vessel 20. In this instance collapsible structures 32 are in the form of hollow capsules or spheres. FIG. 3 shows collapsible foam structures 34 within pressure vessel 20 some of which are mounted on armature 36 to provide a higher concentration of collapsible structures at the bottom of pressure vessel 20 than in other portions of pressure vessel 20. Two alternative types of resilient collapsible structures are depicted in FIGS. 4 and 4A. FIG. 4 shows a capsule 38, perhaps of the size of a typical gelatine medicine capsule, biased to a high interior volume by spring means 40. Capsule 38 can collapse by forcing the smaller portion 42 into the larger portion 44. When this happens, spring means 40 compresses storing energy for reexpanding capusle 38 when external forces diminish. Similarly, a cube or other convenient shape of closed cell foam 46 as depicted in FIG. 4A operates in a similar manner.

While the present invention has been described with respect to hydrogen storage, it will be appreciated that the invention is not limited to storage usage but is applicable for whatever purpose metal hydrides are formed and decomposed within a containing vessel. In addition, the invention is not limited to hydrogen but is applicable to any gas which reacts reversibly with any solid to form products with volume changes. For example, the invention is applicable to processes involving the formation of ammines using metal halides as the material reacting with ammonia. Specifically with regard to hydride formation, those skilled in the art will appreciate that metals and metallic compounds such as $CaNi_5$, $LaNi_5$, $SmCo_5$, FeTi, $Mg_2Ni$, V, Mg, etc., can be used as hydride formers.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A gas-containing means comprising
   (a) a pressure resistant vessel having a valved port,
   (b) at least one collapsible structure in said vessel enclosing unavailable space, said structure being impermeable to solids and being collapsible at a stress less than the stress sufficient to plastically deform said vessel; and
   (c) a multiplicity of solid, gas absorbing particles in said vessel occupying, when in the gas-free state, substantially less than the available space in said vessel, and, when in the gas-charged state, no greater than the available space in said vessel.

2. A gas-containing means as in claim 1 wherein said vessel contains a multiplicity of collapsible structures relatively uniformly distributed throughout the volume of said vessel.

3. A gas-containing means as in claim 1 wherein said vessel contains a multiplicity of collapsible structures distributed within said vessel so as to be higher in concentration near the bottom of said vessel than in other parts of said vessel.

4. A gas-containing means as in claim 1 wherein said at least one collapsible structure is a resilient collapsible structure.

5. A gas-containing means as in claim 1 wherein the collapsible structure is a perforated metallic tube positioned axially in said vessel, extended substantially the length of said vessel, closed at one end and having the other end thereof connected to said valved port so as to provide a means of passage of gas to and from said valved port.

6. A gas-containing means as in claim 2 wherein the collapsible structures are hollow metal or plastic items.

7. A gas-containing means as in claim 2 wherein the collapsible structures are foamed structures.

8. A gas-containing means as in claim 3 wherein the collapsible structures are mounted on an armature means to provide the proper disposition of the structures.

* * * * *